United States Patent
Strassenburg-Kleciak

(10) Patent No.: US 9,243,926 B2
(45) Date of Patent: Jan. 26, 2016

(54) ELECTRONIC MAP SYSTEM

(71) Applicant: Harman Becker Automotive Systems GmbH, Karlsbad (DE)

(72) Inventor: Marek Strassenburg-Kleciak, Garching (DE)

(73) Assignee: HARMAN BECKER AUTOMOTIVE SYSTEMS GMBH, Karlsbad (DE)

( * ) Notice: Subject to any disclaimer, the term of this patent is extended or adjusted under 35 U.S.C. 154(b) by 96 days.

(21) Appl. No.: 13/949,783

(22) Filed: Jul. 24, 2013

(65) Prior Publication Data

US 2014/0032111 A1      Jan. 30, 2014

(30) Foreign Application Priority Data

Jul. 27, 2012   (EP) ..................................... 12178216

(51) Int. Cl.
*G01C 21/32*   (2006.01)
*G01C 21/34*   (2006.01)
*G01C 21/36*   (2006.01)

(52) U.S. Cl.
CPC ............ *G01C 21/3667* (2013.01); *G01C 21/32* (2013.01); *G01C 21/3682* (2013.01)

(58) Field of Classification Search
None
See application file for complete search history.

(56) References Cited

U.S. PATENT DOCUMENTS

2008/0243367 A1 *  10/2008  Wako .......................... 701/200
2009/0171558 A1 *   7/2009  Davis et al. .................. 701/200
2010/0115407 A1 *   5/2010  Kim et al. .................... 715/708

FOREIGN PATENT DOCUMENTS

WO   WO 2008/041705 A1   4/2008

OTHER PUBLICATIONS

European Search Report, EP 12 178 216.3, The Hague, Jan. 9, 2013, 52 pgs.

* cited by examiner

*Primary Examiner* — John R Olszewski
*Assistant Examiner* — Gerrad A Foster
(74) *Attorney, Agent, or Firm* — Artegis Law Group, LLP

(57) ABSTRACT

An electronic map may be output based on map data including information related to a current configuration of each of a plurality of map objects and historical attributes of at least a portion of the plurality of map objects. The historical attribute associated with a map object may include information related to a historical configuration of the respective map object in the past. A time selection input may be received at a user interface. The map data may be processed to identify a map object having a current configuration different from a historical configuration at a time in the past which is determined based on the time selection input. An optical output device may be controlled to output a graphical representation of the identified map object that is dependent on both the current configuration and the historical configuration of the identified map object.

19 Claims, 7 Drawing Sheets

ELECTRONIC MAP SYSTEM

PRIORITY CLAIM

This application claims the benefit of priority from European Patent Application No. 12 178 216.3, filed Jul. 27, 2012, which is incorporated by reference.

BACKGROUND OF THE INVENTION

1. Technical Field

Embodiments of the invention relate to a navigation system having a map database which includes historical attributes. Embodiments of the invention relate in particular to a navigation system in which the map data are used to output an electronic map.

2. Related Art

Optical output devices are widely used in navigation devices. Such output devices may be used for outputting electronic maps. Since electronic maps may be displayed on screens of small and/or portable devices, they have the advantage of being versatile and compact. Data displayed on electronic maps may be easily modified and adapted, e.g., by changing the zoom level of the map portion displayed, by displaying additional objects that might be of relevance to the user, such as directional arrows indicating a direction change in a navigation device, or by highlighting objects that may be of relevance to the user. Three-dimensional maps may be of particular value to the user owing to their high recognition quality. Various map objects, such as certain buildings or other landmarks, may be included in three-dimensional maps or city models output to a user.

SUMMARY

A navigation system uses historical information of navigation databases. The navigation system can provide additional utility to the user when it comes to utilizing historical information stored in navigation databases. The navigation system may use such information for displaying map objects on an electronic map.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF EMBODIMENTS

Figure 1:
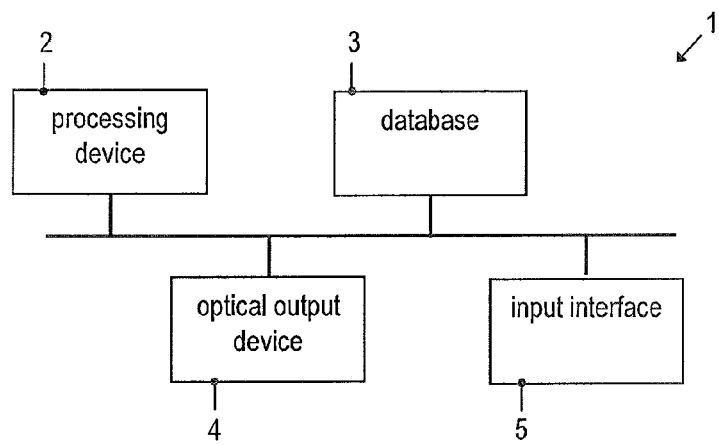
FIG. 1 is a schematic block diagram of a navigation device of an embodiment.

Embodiments of the invention will be described with reference to the drawings. While some embodiments will be described in specific contexts, such as for outputting plan view maps or 3D maps, the embodiments are not limited thereto. Further, while some embodiments will be described with reference to certain types of map objects, such as roads, buildings or city furnishing objects, the embodiments are not limited thereto. The features of the embodiments may be combined with each other unless explicitly stated otherwise in the description of the embodiments.

Map databases may include additional information. For example, community scenarios in which a significant number of users may report changes in road network or other map objects to a central facility may enhance the amount of information available in a map database.

For illustration rather than limitation, open geo databases, also sometimes referred to as open source geo databases, may include information collected by various users at various locations and at various times, thereby providing historical information which may cover a time span of several years or even decades. The information available in open geo databases will continue to increase in the future. The decreasing costs of storage space also make it viable to provide map databases which do not only include information representing the current, i.e. most recent monitored, configuration of a map object, but to further supplement the map database to include information from the past. This information may be taken from historical cadastral maps, for example, or from any other suitable source. It may be desirable to utilize such historical information stored in map databases to provide enhanced functionality of a navigation device.

The navigation system may include a navigation device according to an embodiment that includes a database. The database stores map data which includes current information related to a current configuration for map objects and historical attributes for at least some of the map objects. Each historical attribute associated with a map object can include information related to a historical configuration of the respective map object at a time in the past. The navigation system may include a user interface configured to receive a time selection input. The navigation system includes a processing device coupled to the database and the user interface. The processing device may be configured to identify, based on the historical attributes and the time selection input received at the user interface, a map object which has a current configuration different from a historical configuration, with the historical configuration corresponding to a time in the past which is determined based on the time selection input. The processing device is configured to control an optical output device to output a graphical representation of the identified map object on an electronic map. The graphical representation may be dependent on both the current configuration and the historical configuration of the identified map object at the time in the past specified by the time selection input.

In the navigation device, information relating to a historical configuration, i.e. a configuration of a map object at a time in the past which is different from a current configuration of this map object, may be utilized when displaying the map object on an electronic map. The historical configuration may be selected based on a time selection input, thereby allowing a user to use the database of the navigation device to view changes in a map object such as, for example, a road network, building constructions and/or city furnishing as a function of time in the past in accordance with a user input. The navigation device may thereby be used as a device for travelling through the past in the sense that changes to the road network and/or buildings and/or city furnishing may be viewed on the electronic map output by the navigation device.

In the navigation device, the graphical representation of the identified map object may be dependent on both the current configuration and the historical configuration of the identified map object. This may enable temporal changes of map objects to be understood in the context of the present configuration of the environment displayed on the electronic map.

It should be understood that, as used herein, the term "current configuration" of a map object refers to the most recent information available for the respective map object in the database. This information is not necessarily identical to the real-world appearance of the respective map object when the latter was modified recently, e.g. after the last update date of the map database.

It should also be understood that, as used herein, the terms "time" and "time selection input" allow the time to be specified with a coarse granularity, e.g. in terms of months or years in the past. For illustration, the time selection input may specify a given month in one of the past years. In other configurations, the time selection input may only specify a year. The terms "time" and "time selection input" do not require that the time be necessarily specified to a high degree of precision, such as including time of day.

The historical attribute of an object may define a historical configuration of the map object at a given time or throughout a given time span in the past. Each historical attribute may be defined for and related to a single map object, rather than being obtained by averaging data obtained for plural different map objects.

The processing device may be configured to control the optical output device to output the graphical representation such that it simultaneously shows the current configuration and the historical configuration of the identified map object. The graphical representation may be generated such that the current configuration and the historical configuration may be shown in different styles, such that they can be discriminated from one another.

The processing device may be configured to control the optical output device such that the graphical representation shows the current configuration of the identified map object in a first output mode and the historical configuration of the identified map object in a second output mode different from the first output mode. The first and second output modes may correspond, for example, to different colors, different transparencies, and/or different boundary line styles.

The processing device may be configured to control the optical output device to output the graphical representation such that one of the current configuration or the historical configuration is displayed as an overlay for the other one of the current configuration or the historical configuration. This may enable the historical configuration to be directly compared to and understood in the context of the current configuration. For illustration, construction or deconstructions of a building between the time specified by the time selection input and the most recent time covered by the database may be viewed on and easily understood in view of the electronic map.

The processing device may be configured to monitor whether another time selection input is received at the user interface and to control the optical output device to update the graphical representation in response to the other time selection input. This may enable the graphical representation to be dynamically updated in response to a user input. The user can monitor changes that were made to a map object over a time span by inputting new time selection inputs, thereby showing different building stages of the map object.

The identified map object may be a road segment. The current configuration and the historical configuration may correspond to different courses of the road segment. Alternatively or additionally, the current configuration and the historical configuration may correspond to different names of the road segment.

The identified map object may be a building. The current configuration and the historical configuration may correspond to different boundaries of the building. The current configuration and the historical configuration may correspond to different three-dimensional boundaries of the building which are shown on a three-dimensional map.

The electronic map may be a map shown in plan view. In this case, the historical and current configurations of the identified map object may show the boundaries of the respective map object in plan view. The boundaries of the historical and current configurations may be displayed simultaneously and in different output modes, e.g., different color schemes.

The electronic map may be a three-dimensional (3D) map. The 3D map may be a bird's eye view or a snail's eye view, for example. The historical and current configurations of the identified map object may show the boundaries of the respective map object in a perspective view. The boundaries of the historical and current configurations may be displayed simultaneously and in different output modes, e.g. different color schemes. For a map object which is a building, the historical and current configurations may correspond to different building shapes, which may be distinguished in the position and/or patterning of wall facets or roof facets. For a map object which is a road segment, 3D-changes may be taken into account, for example, when a street crossing was reconstructed to a roundabout at an elevated level, with ramp-type streets leading to the roundabout.

The processing device may be configured to determine plural different historical configurations of the identified map object at plural different times in the past. The plural different times may respectively be included in a time interval having a start time defined by the time selection input. This may enable sequential changes in the configuration of the map object to be automatically determined. For illustration, when the time in the past is set by the time selection input, the processing device may automatically determine not only the historical configuration of the map object at that respective time, but also intermediate configurations between the historical configuration at the time defined by the time selection input and the most recent configuration stored in the database.

The processing device may be configured to control the optical output device to output plural graphical representations of the identified map object in a time-sequential manner. Each one of the plural graphical representations may depend on the current configuration and at least one of the plural historical configurations of the identified map object. The input interface may have an activation area which enables a user to activate the time-sequential displaying of the electronic map for plural different times in the past. When activated, the processing device may automatically generate a sequence of representations of the identified map object which each reflect the historical configuration at a given time in the past as compared to the current configuration. The given time in the past may be automatically determined by adding increments to the time set by the time selection input up to the current time, thereby playing back a movie on the electronic map which shows the changes made to a map object in animated form.

The historical attributes may respectively include validity information defining a time span to which the historical configuration applies. The validity information may define a date in the past, e.g. a date at which the respective historical information was captured. The validity information may include a valid start date and a valid end date. The historical configuration may be defined by the respective historical attribute representing the state of the map object from the valid start date through the valid end date.

The processing device may be configured to retrieve the validity information and to compare the validity information to the time in the past which is determined based on the time selection input. The processing device may be configured to determine whether the validity information overlaps with a time interval between the time set by the time selection input and the current time.

The database may be used for additional functions, in addition to the displaying of information on historical configurations on an electronic map. For example, the processing device may be configured to perform route guidance based on the historical attributes.

The processing device may be configured to access the historical attributes to retrieve information related to a destination address for the route guidance. For example, the processing device may be configured to access the historical attributes to retrieve information related to a destination address for the route guidance selectively only if no match for a destination address input by the user is found in the current configuration data.

The processing device may be configured to access the historical attributes to retrieve information related to a map portion which is to be displayed as an electronic map, in response to receiving an alphanumerical input specifying an object in the map portion that is to be displayed. The alphanumerical input may specify an address or name of a point of interest, for example. The processing device may be configured to access the historical attributes to retrieve information related to the map portion for map display selectively only if no match for the alphanumerical string input by the user is found in the current configuration data.

The navigation device may include an optical output device coupled to the processing device and configured to receive control commands from the processing device. The optical output device may be configured to output the graphical representation of the identified map object. The processing device may be coupled to the optical output device via a vehicle board network.

The processing device may be configured to control the optical output device such that a graphical representation determined based on historical attributes and a current configuration of a map object is displayed for each map object located in a geographical area covered by the electronic map.

The navigation device may be a vehicle navigation device. The navigation device may have mounts for fixedly installing the navigation device in a vehicle. The navigation device may be a portable navigation device. The navigation device may have an interface for communication with a vehicle board network.

A method of outputting an electronic map according to an embodiment uses map data stored in a database. The map data includes information on a current configuration for a plurality of map objects and historical attributes for at least some map objects of the plurality of map objects. The historical attribute associated with a map object may include information on a historical configuration of the respective map object in the past. In the method, a time selection input may be received at a user interface. The map data may be processed to identify, based on the historical attributes and the time selection input received at the user interface, a map object which has a current configuration different from a historical configuration at a time in the past which is determined based on the time selection input received at the user interface. An optical output device may be controlled to output a graphical representation of the identified map object on the electronic map. The graphical representation may be dependent on both the current configuration and the historical configuration of the identified map object.

Additional features which may be used in the method as well as the effects attained thereby may correspond to one or more of the features and effects of the navigation devices of embodiments.

The optical output device may be controlled to output the graphical representation such that it simultaneously shows the current configuration and the historical configuration of the identified map object. The graphical representation may be generated such that the current configuration and the historical configuration may be shown in different styles, such that they can be discriminated from one another.

The optical output device may be controlled such that the graphical representation shows the current configuration of the identified map object in a first output mode and the historical configuration of the identified map object in a second output mode different from the first output mode. The first and second output modes may correspond, for example, to different colors, different transparencies, and/or different boundary line styles.

The optical output device may be controlled such that one of the current configuration or the historical configuration is displayed as an overlay for the other one of the current configuration or the historical configuration.

The method may include monitoring whether another time selection input is received at the user interface. The optical output device may be controlled to update the graphical representation in response to the other time selection input.

The identified map object may be a road segment. The current configuration and the historical configuration may correspond to different courses of the road segment. Alternatively or additionally, the current configuration and the historical configuration may correspond to different names of the road segment.

The identified map object may be a building. The current configuration and the historical configuration may correspond to different boundaries of the building.

The electronic map may be a map shown in plan view. In this case, the historical and current configurations of the identified map object may show the boundaries of the respective map object in plan view. The boundaries of the historical and current configurations may be displayed simultaneously and in different output modes, e.g., different color schemes.

The electronic map may be a three-dimensional (3D) map. The 3D map may be a bird's eye view or a snail's eye view, for example. The historical and current configurations of the identified map object may show the boundaries of the respective map object in a perspective view. The boundaries of the historical and current configurations may be displayed simultaneously and in different output modes, e.g. different color schemes. For a map object which is a building, the historical and current configurations may correspond to different building shapes, which may be distinguished in the position and/or patterning of wall facets or roof facets. For a map object which is a road segment, 3D-changes may also be taken into account, such as in cases where a street crossing was reconstructed to build a roundabout at an elevated level, with ramp-type streets leading to the roundabout.

In the method, plural different historical configurations of the identified map object at plural different times in the past may be determined. The plural different times may respectively be included in a time interval having a start time defined by the time selection input.

The optical output device may be controlled to output plural graphical representations of the identified map object in a time-sequential manner, each one of the plural graphical representations depending on the current configuration and at least one of the plural historical configurations of the identified map object.

The historical attributes may include validity information defining a time span to which the historical configuration applies. The validity information may define a date in the past, e.g., a date at which the respective historical information was captured. The validity information may include a valid start date and a valid end date, with the historical configuration corresponding to the state of the map object from the valid start date through the valid end date.

The validity information may be compared to the time in the past which is determined based on the time selection input. The method may include determining whether the validity information overlaps with a time interval from the time specified by the time selection input and the current time.

The database may be used for additional functions, in addition to the displaying of information on historical configurations on an electronic map. For example, route guidance and/or identification of map portions may be performed based on the historical attributes.

The historical attributes may be accessed to retrieve information related to a destination address for the route guidance and/or for identifying a map portion that is to be displayed. For example, the historical attributes may be accessed selectively only if no match for an alphanumerical input provided by the user is found in the current configuration data.

A graphical representation which is determined based on historical attributes and a current configuration of a map object may be output for each map object located in a geographical area covered by the electronic map that is displayed.

The method may be performed using the navigation device of any one aspect or embodiment.

According to another embodiment, a computer program is provided which includes instruction code, which, when executed by a processing device of a navigation device, directs the navigation device to perform the method of outputting a map of any one aspect or embodiment.

It is to be understood that the features mentioned above and those to be explained below can be used not only in the respective combinations indicated, but also in other combinations or in isolation.

FIG. 1 schematically illustrates a navigation device 1 according to one exemplary embodiment. The navigation device 1 includes a processing device 2, which may control the operation of the navigation device 1. The processing device 2 may include a central processing unit, for example, in the form of one or more microprocessors, digital signal processors, or application-specific integrated circuits. Additionally, or alternatively, the processing device 2 may include a graphics processor. The processing device 2 may be configured to include a general processor, a digital signal processor, an application specific integrated circuit, a field programmable gate array, an analog circuit, a digital circuit, a server processor, combinations thereof, or other now known or later developed processor. The processing device 2 may be configured as a single device or combination of devices, such as associated with a network or distributed processing. Any of various processing strategies may be used, such as multi-processing, multi-tasking, parallel processing, remote processing, centralized processing or the like. The processing device 2 may be responsive to or operable to execute instructions stored as part of software, hardware, integrated circuits, firmware, micro-code, or the like.

The navigation device 1 may include a database 3 stored in a storage device. The storage device may include any one, or any combination, of various types of memory, such as, for example, random access memory, flash memory or a hard drive. Additionally, or alternatively, the storage device may include a removable memory such as, for example, a compact disk (CD), a DVD, a memory card or the like. The storage device may include, for example, one or more of a hard disk device, a CD-ROM device, a DVD device, a ROM memory device, or any other one or more tangible, non-transitory data storage medium. Rewritable non-volatile memory, such as flash memory, may be provided to store data and information in a flexible way and/or to maintain the stored information even in the case of a power outage.

The navigation device 1 may include an output interface for outputting information to a user. The output interface may include an optical output device 4. The navigation device 1 may include an input interface 5. The input interface 5 and the optical output device 4 may be combined in one unit, e.g., in a touch-sensitive or proximity sensing display screen.

The navigation device 1 may include additional components, such as, for example, a position sensor and/or a wireless receiver and/or a vehicle interface. The position sensor may be adapted to determine the current position of the vehicle in which the navigation device 1 is installed. The position sensor may include a Global Positioning System (GPS) sensor, a Galileo sensor, a position sensor based on mobile telecommunication networks and the like. The wireless receiver may be configured to receive information for updating the map database stored in the storage device 3. The vehicle interface may enable the processing device 2 to obtain information from other vehicle systems or vehicle status information via the vehicle interface. The vehicle interface may include, for example, a controller area network (CAN) and/or a Media Oriented Systems Transport (MOST) interface.

The storage device may store a database 3 for use in outputting electronic maps and for use in route guidance. The database may include information for performing route search and route guidance. The database 3 may include, for a plurality of map objects, respectively information that defines a current configuration of the map objects. For at least some of the map objects, the database 3 also may include historical attributes. The historical attributes may define a configuration of the associated map object at a time in the past. The database 3 may be or may include an open geo database.

In operation of the navigation device 1, the processing device 2 may control the output interface 4 to output a map object. As will be described in more detail later, rendering may be performed to display a geographical representation of the map object which depends both on the current configuration defined by the map data in the database 3 and an historical attribute for the respective map object. For illustration, a representation of the map object may be output which includes the current configuration and the historical configuration, the latter being shown as an overlay and partially transparent. Depending on a time selection input received at the input interface 5, a historical configuration that matches the time specified by the time selection input may be automatically selected by the processing device 2. Depending on whether a plan view map or a three-dimensional (3D) map is to be output, the processing device 2 may automatically generate a graphical representation which reflects the changes in the configuration of the map object in the time interval between a time in the past set by the time selection input and the most recent configuration stored in the database 3, referred to as current configuration herein.

The historical attributes stored in the database 3 may not only be used for outputting electronic maps that illustrate changes in the configuration of the map object, but may also be used for route guidance functions. For illustration, when the processing device 2 determines that there is no match for a destination address input by a user at the input interface 4 in the current configuration data stored in the database 3, the historical attributes stored in the database 3 may be accessed. Thereby, an address search may be automatically based on historical names of streets or cities, for example, if an address input does not correspond to a current address and appears to be based on a historical name.

Figure 2:
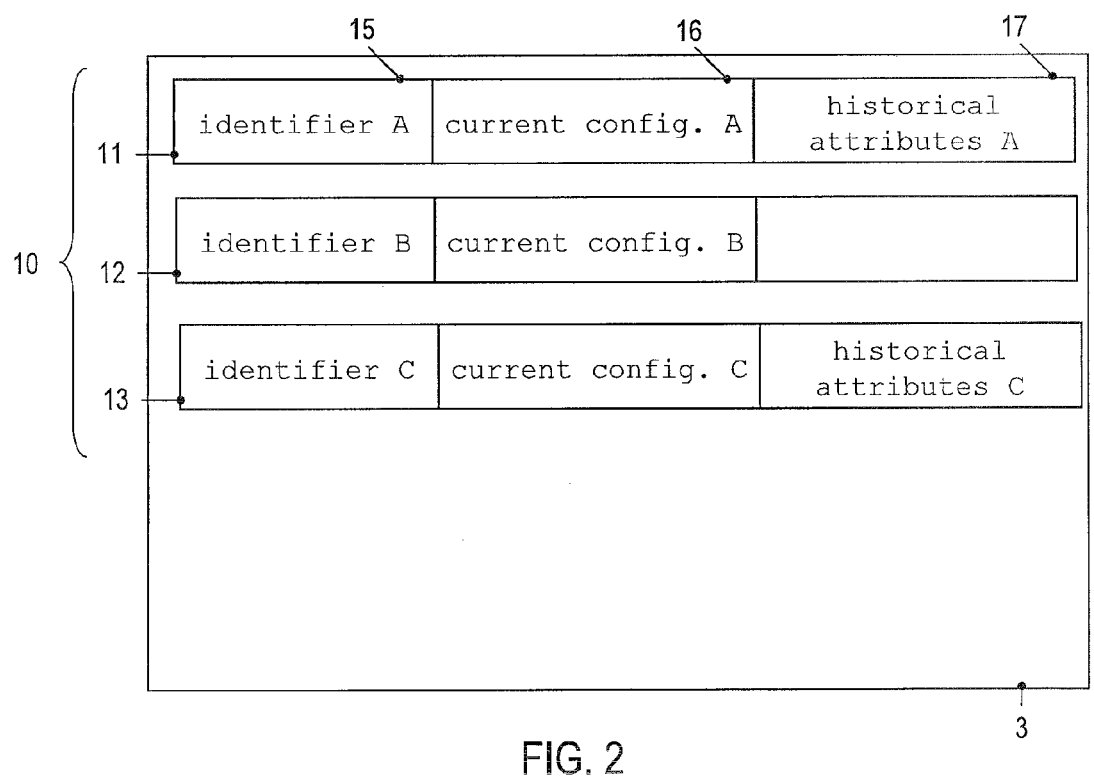
FIG. 2 is a schematic representation of a database of an embodiment.

FIG. 2 is a schematic representation of one example of a database 3. The database 3 may be used in the navigation device 1 of FIG. 1. The database 3 may include map data 10. Generally, the map data 10 define, for a plurality of map objects, respectively a configuration of the map object. The configuration may include a name, information related to a geo location, an object type identifier, which distinguishes different classes of objects, such as, for example, buildings and roads, and other information which may be specific to the respective object type. For illustration, for road segments, the other information may include information related to a function road class (FRC), a road course of the respective road segment, a number of lanes, a name of the road, or similar. For further illustration, for a building, the other information may include information related to a footprint of the building, facets of building walls, patterns applied to building walls, facets of roofs, or similar. The database 3 may include one table or plural tables, as schematically illustrated in FIG. 2. The database 3 may be a relational database.

The map data 10 may include, for example, entries 11-13, each of which is associated with a map object. The number of entries in the table may be selected in accordance with the number of different map objects. The map data 10 may define the configurations of plural map objects. For illustration, the map data 10 may include, for each map object, data 15 defining an identifier for the map object and data 16 defining a current configuration of the map object. The information related to the current configuration may at least include information which defines the appearance of the map object in a plan view map and/or in a 3D map. The information related to the current configuration may include information related to a name of the map object, e.g., on a road name or a name of a point of interest (POI). For at least some of the map objects, the map data 10 further may include other data 17 storing one or several historical attributes for the respective map object. The historical attribute(s) may define the appearance of the map object in a plan view map and/or in a 3D map, but for a historical configuration at a time in the past which is different from the current configuration defined by data 16. The historical attribute(s) may define a name which the map object had in the past.

A wide variety of other formats for the map data 10 may be used. For illustration, the database 3 may include first data defining the current configurations of plural map objects and second data defining historical attributes. The first data may include one or plural first tables, and the second data may include one or plural second tables. When a map update is performed for the database 3 of the navigation device, information from the previous version of the map may be retained as historical attributes, and the new map data may be stored in addition to the previous version. The release date of each map may be stored to provide information on the temporal validity of the respective data. Alternatively or additionally, the database may include different tables for different types of data, such as, for example, a table for geo locations of map objects, a table for shapes of map objects, a table of names of map objects, etc. Each one of the tables may include both the current configuration and historical attributes for at least some objects. In other implementations, there may be a separate table for the current configuration and for the historical configuration respectively for the shapes, the names, etc.

The historical attribute(s) may include validity information defining the time or time interval in the past for which the historical configuration defined by the historical attribute(s) is valid. The validity information may be stored separately from the historical attribute(s). For illustration, when there are dedicated tables or dedicated files which only store historical attributes, the validity information which defines at which time in the past the respective historical attribute(s) apply to the respective map objects may be stored in a header of the file or table, or alternatively, in yet another table which defines a mapping between tables of historical attributes and various times in the past.

Figure 3:
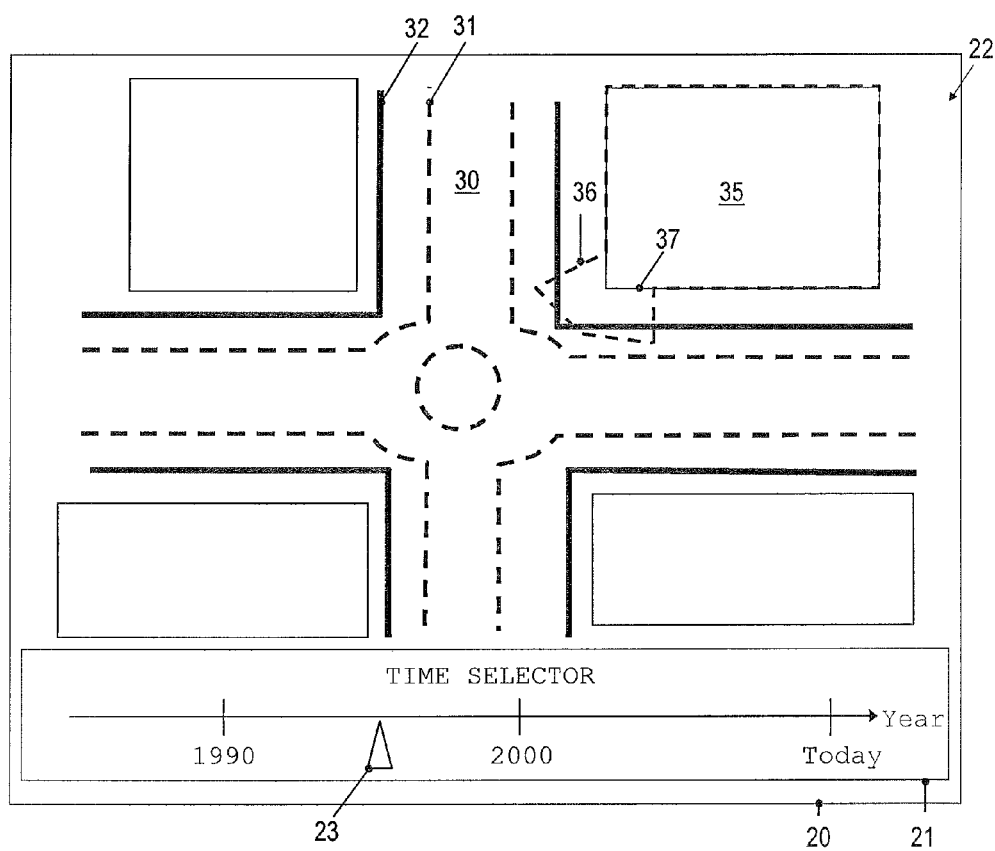
FIG. 3 is a schematic representation of an input/output interface illustrating an electronic map output by the navigation device of an embodiment.
Figure 4:
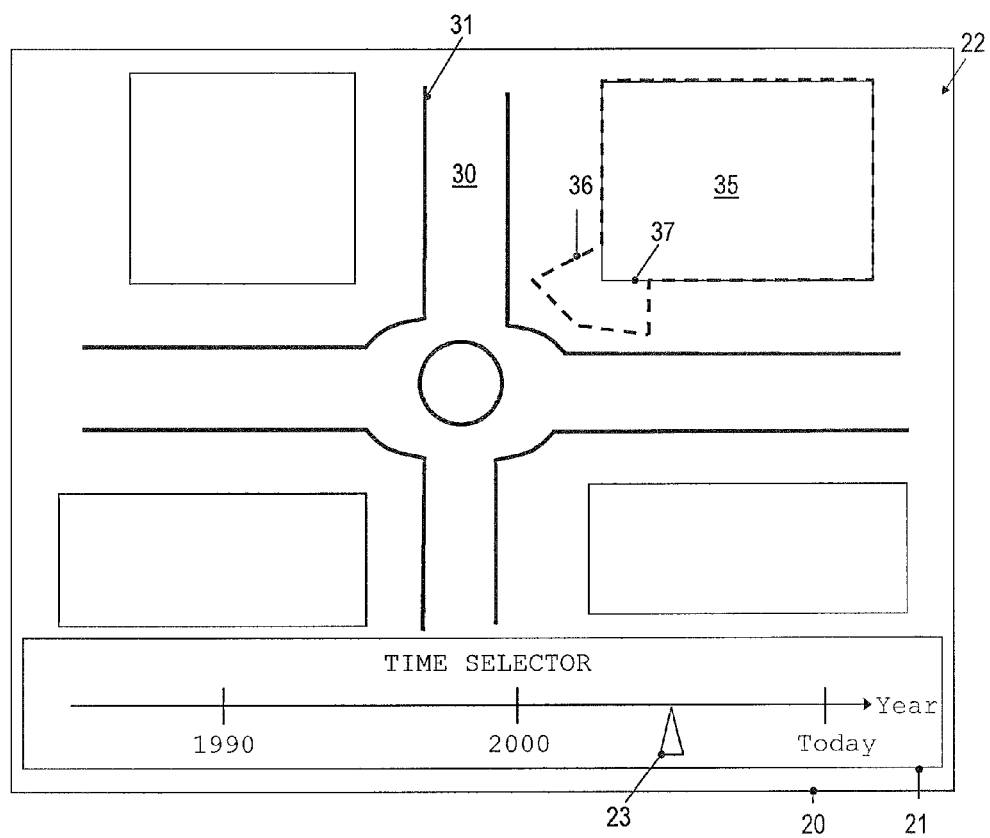
FIG. 4 is a schematic representation of the input/output interface of FIG. 3 illustrating the electronic map after adjustment of a time selection input.

FIGS. 3-4 illustrate an input/output (I/O) interface 20 of the navigation device of an embodiment. The I/O interface 20 may be configured, for example, as a touch panel or a proximity-sensing display panel. The I/O interface 20 may be used in the navigation device 1 of an embodiment.

The I/O interface has an input section 21 configured so as to enable a user to input a time in the past. For illustration, the input section 21 may be configured so as to enable a selection element 23 to be displaced along the input section 21, thereby enabling the user to input a time selection input specifying a time in the past. The processing device 2 may retrieve the time selection input set via the input section 21 and control the displaying of map objects on an electronic map 22 which is output over the I/O interface.

For all map objects located in the geographical region covered by the electronic map 22, the processing device 2 may determine, based on the time selection input and the historical attributes, which map objects had a historical configuration, at the time indicated by the time selection input, which is different from a current configuration of the respective map object. The processing device 2 may retrieve historical attributes and may filter historical attributes based on the time selection input. The processing device 2 may be configured to identify historical attributes which are associated with a map object located in the geographical region of the electronic map 22 and to determine, based on validity information of the historical attributes, whether the respective historical attribute applied at the time specified by the time selection input.

In this way, the processing device 2 may determine which map objects have undergone a change in configuration, from a historical configuration at the time set by the time selection input to a current configuration different therefrom. The processing device 2 may determine for which map objects to be displayed on the electronic map 22 there has been a change in configuration in a time interval determined based on the time selection input. The processing device 2 may control the I/O interface such that graphical representations of map objects are generated which depend on both the historical configuration of the respective map object at the time indicated by the time selection input and the current configuration. The processing device 2 may determine the historical configuration based on the historical attributes, filtered in accordance with the time selection input. The processing device 2 may determine the current configuration based on the data 16 stored in the database 3.

The processing device 2 may process the data stored in the database 3 to generate a graphical representation of a map object that is based on both the historical configuration and the current configuration of the map object. For illustration, for any map object that is to be displayed on the electronic map 22 and which had a different historical configuration at the time indicated by the time selection input, the processing device 2 may display a graphical representation which shows both the historical configuration and the current configuration simultaneously. In order to enable the current and historical configurations to be easily distinguished from each other, the processing device 2 may control the output section of the I/O interface 20 such that the current configuration and historical configuration are shown in different styles. For illustration, one of the current configuration or the historical configuration may be displayed in a first color and the other one of the current configuration or the historical configuration may be displayed in a second color different from the first color. One of the current configuration or the historical configuration may be displayed as partially transparent overlay overlaid onto the other one of the current configuration or the historical configuration.

Referring to FIG. 3, there is shown a road segment 30, for which a road course of a road segment 30 has undergone a change. A road course at the time in the past set by the time selection input is different from a current road course. The processing device 2 may control the optical output device such that a graphical representation of the road segment 30 displayed on the electronic map shows the current configuration 31 and the historical configuration 32. As shown in FIG. 3, the current configuration 31 is output in a first mode, e.g., with a broken boundary, and the historical configuration 32 is output in a second mode, e.g., with a solid boundary. Coordinate matching may be performed between the historical and the current map to ensure that the historical configuration(s) is displayed at the correct location, in the coordinate frame of the current map. With this graphical representation of the road segment 30, information is conveyed to the user which does not only provide information on how a certain geographical area looked in the past, but which correlate features of the historical map to features of the current map.

With continued reference to FIG. 3, the electronic map includes a building 35, and a footprint of the building 35 has undergone a change in the past. The footprint at the time in the past set by the time selection input is different from a current footprint. The processing device 2 may control the optical output device such that a graphical representation of the building 35 displayed on the electronic map shows the current configuration 36 and the historical configuration 37. As shown in FIG. 3, the current configuration 36 is output in a first mode, e.g., with a broken boundary, and the historical configuration 37 is output in a second mode, e.g., with a solid boundary. While the outputting of map objects on a plan view map is illustrated in FIG. 3, the same techniques may be used for outputting a 3D map.

The processing device 2 may monitor to determine whether a new time selection input is received at the input section 32. The processing device 2 may update the graphical representations displayed on the electronic map 22 when a new time selection input is received.

FIG. 4 illustrates the I/O interface 20 after the time selection input was modified so as to select a different time in the past. When the configuration of the road segment 30 at this different time is identical to the current configuration, the processing device 2 updates the graphical representation of the road segment 30. Only the current configuration 31 is displayed, because there are no relevant historical attributes. When the historical configuration 37 of the building still represents the footprint of the building at the different time in the past selected via the input section 21, the graphical representation of the building 35 is still generated based on both the historical footprint 37 and the current footprint 36.

Figure 5:
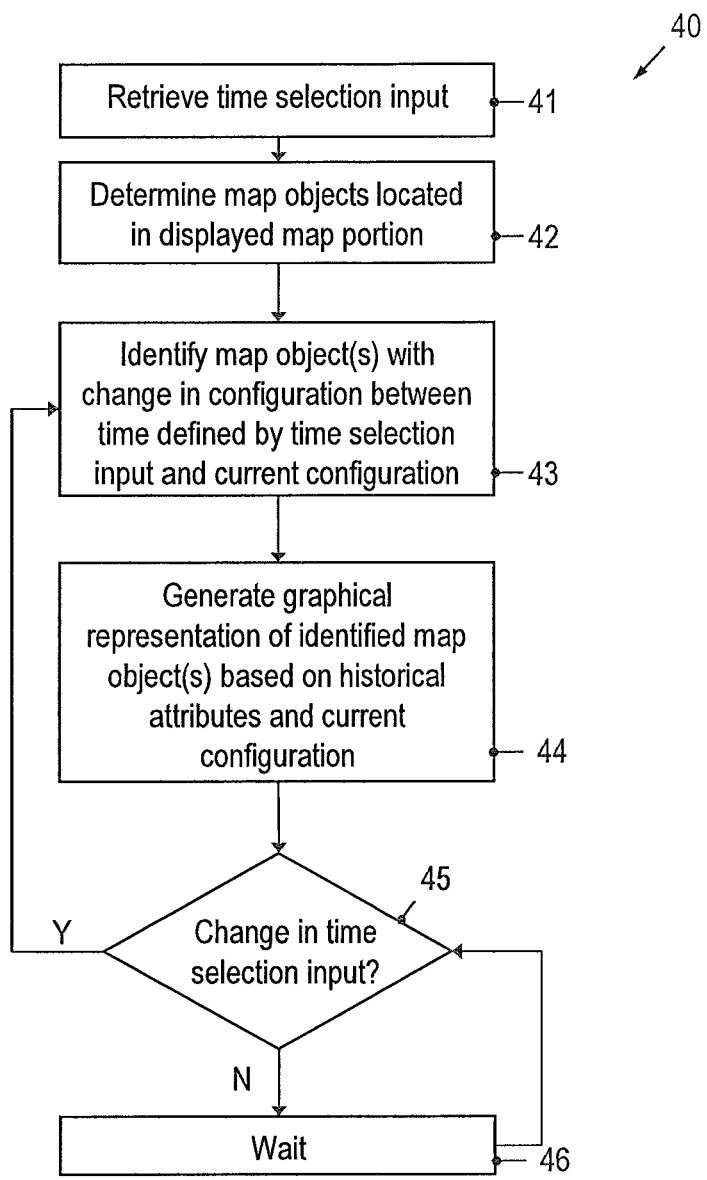
FIG. 5 is a flow chart of a method according to an embodiment.

FIG. 5 is a flow chart of a method 40 according to one exemplary embodiment. The method may be performed by the processing device 2 of the navigation device 1 according to an embodiment. At 41, a time selection input is received. The time selection input may be received at a user interface. The time selection input may specify at least a year in the past. The time selection input may specify a time in the past with higher temporal resolution, such as by month or even by date.

At 42, map objects are determined which are located in a geographical area shown in an electronic map. At 43, the ones of the map objects located in the geographical area are identified which have a historical configuration, as defined by historical attributes of the map database, different from a current configuration. To identify these map objects, historical attributes may be compared to the time defined by the time selection input received at 41. Filtering of historical attributes may be performed based on the time selection input received at 41. Validity information, which defines a time or time span through which historical attributes are valid, may be utilized to identify the map objects which, at the time specified by the time selection input, had a configuration that is different from the current configuration.

At 44, a graphical representation of the map objects identified at 43 is generated. The graphical representation may be determined based on the historical attributes and the current configuration. The graphical representation may be generated such that it simultaneously shows the current configuration and the historical configuration which the map object had at the time set by the time selection input.

At 45, it is determined whether a new time selection input is received. Receipt of a new time selection input may trigger the method to revert to 43. Graphical representations are thereby updated in accordance with the new time selection input. When no new time selection input is received, the monitoring may be continued after a wait time at 46.

A change in configuration of a map object as displayed on the electronic map may have any one of a variety of forms. For illustration, a geometrical shape of the map object may change, such that different geometrical shapes of the map object are incorporated into the electronic map. The change in the geometrical shape may affect the two-dimensional (2D) appearance and/or the 3D appearance of the map object. Additionally or alternatively, the name of a map object may change. Accordingly, displaying a historical configuration may include displaying a historical name of the map object in combination with a current name, as will be illustrated with reference to FIGS. 6-7.

Figure 6:
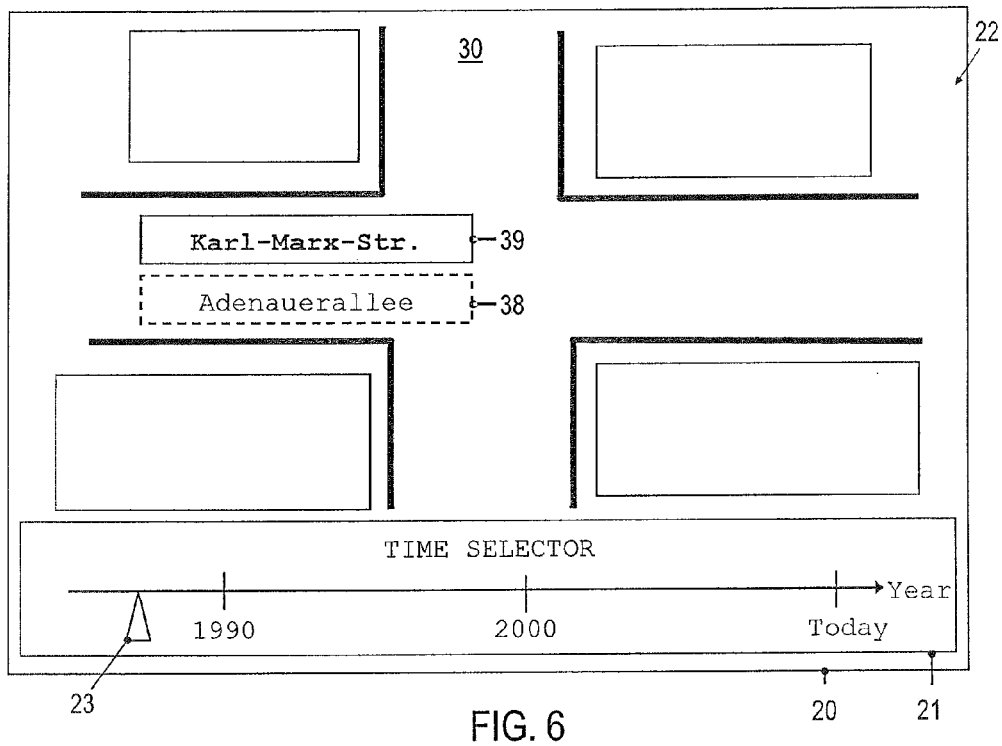
FIG. 6 is a schematic representation of the input/output interface illustrating an electronic map output by a navigation device of an embodiment.
Figure 7:
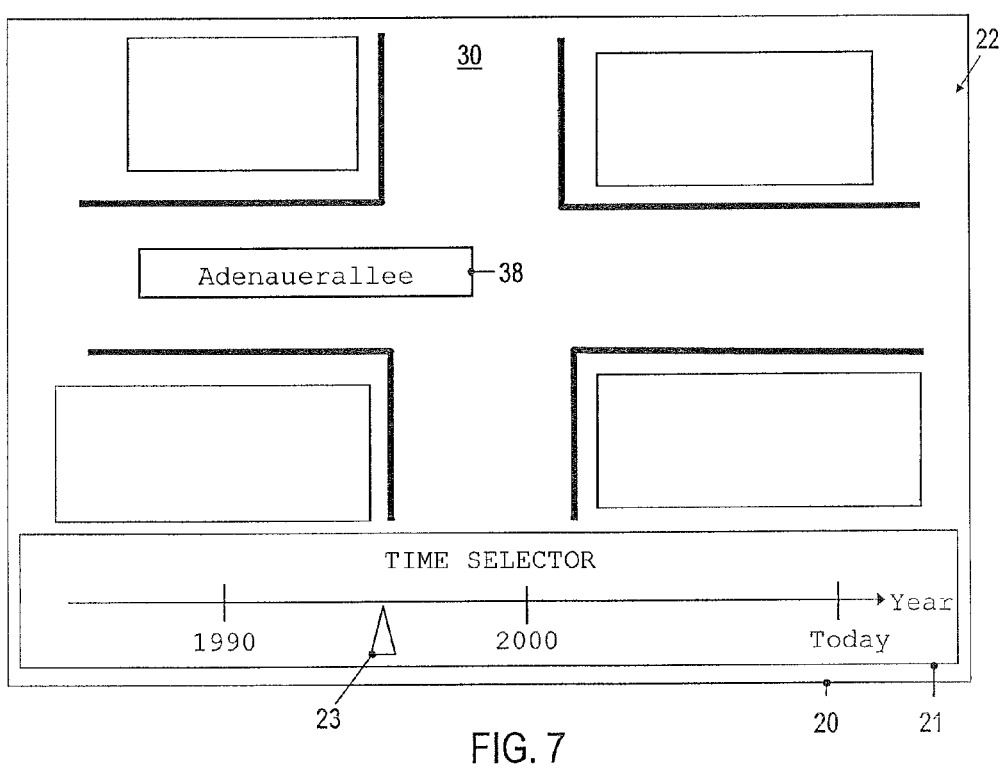
FIG. 7 is a schematic representation of the input/output interface of FIG. 6 illustrating the electronic map after adjustment of a time selection input.

FIGS. 6-7 illustrate an input/output (I/O) interface 20 of the navigation device of one exemplary embodiment. The I/O interface 20 may be configured as a touch panel or a proximity-sensing display panel. The I/O interface 20 may be used in the navigation device 1 of an embodiment.

When a time selection input is received at an input section 21, the processing device 2 retrieves the time selection input set via the input section 21. The processing device 2 may determine, based on the time selection input and the historical attributes in the database 3, whether a configuration of a map object displayed on the electronic map 22 has undergone a change in the time interval from the time specified by the time selection input to the current time. Filtering of historical attributes based on the time indicated by the time selection input may be performed.

Referring to FIG. 6, the electronic map shows a road segment 30, and a name of the road segment 30 has undergone a change in the past. A name at the time in the past set by the time selection input is different from a current name. The processing device 2 may control the optical output device such that a graphical representation of the road segment 30 displayed on the electronic map shows the current configuration, i.e., the current name 38, and the historical configuration, i.e., the historical name 39. The current name 38 is output in a first mode, e.g., with a first font size and/or first color. The historical name 39 is output in a second mode, e.g., with a different font size and/or different color.

FIG. 7 illustrates the I/O interface 20 after the time selection input was modified so as to select a different time in the past. When the configuration, i.e., the name, of the road segment 30 at this different time is identical to the current configuration, the processing device 2 may update the graphical representation of the road segment 30 such that only the current name 38, as opposed to both the current name and the historical name, is displayed, which is independent of any historical attributes. In other embodiments, both a change in geometrical shape, as illustrated in FIGS. 3-4, and a change in name, as illustrated in FIGS. 6-7, may be output via an optical output device.

Figure 8:
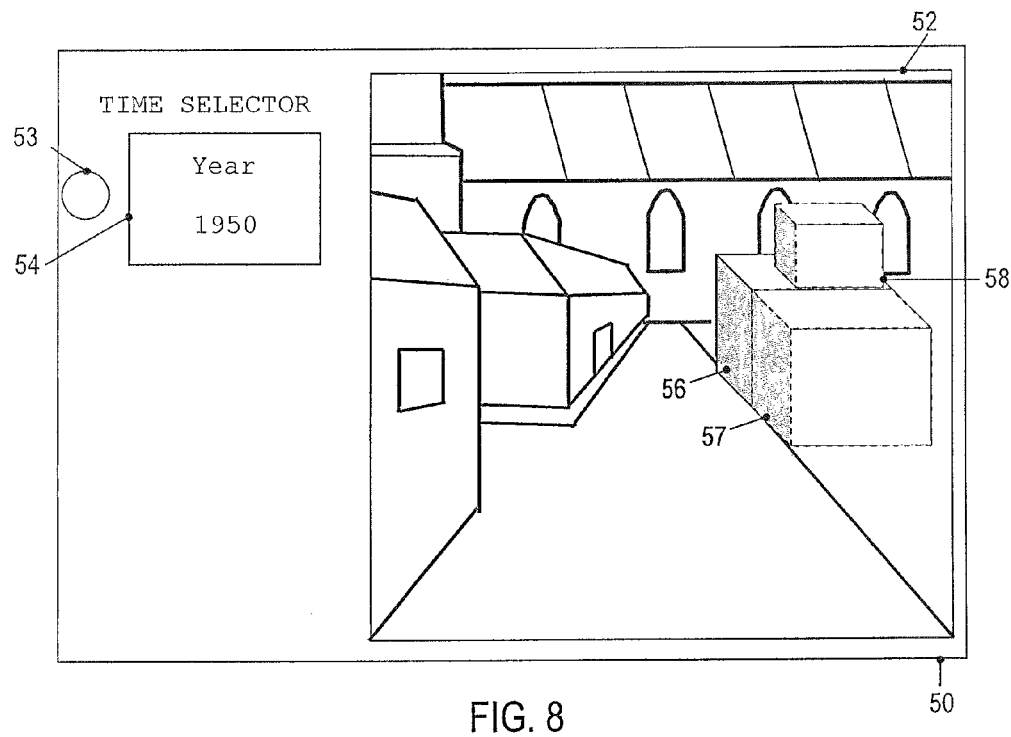
FIGS. 8-10 are schematic representations of an input/output interface illustrating an electronic map output by a navigation device of another embodiment.
Figure 9:
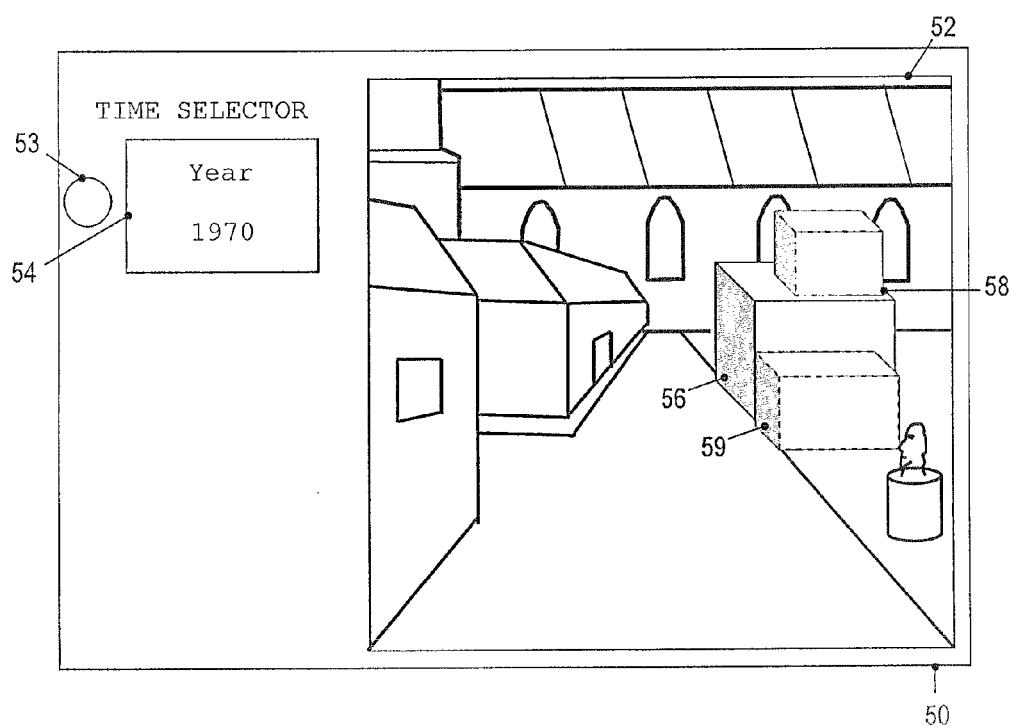
Figure 10:
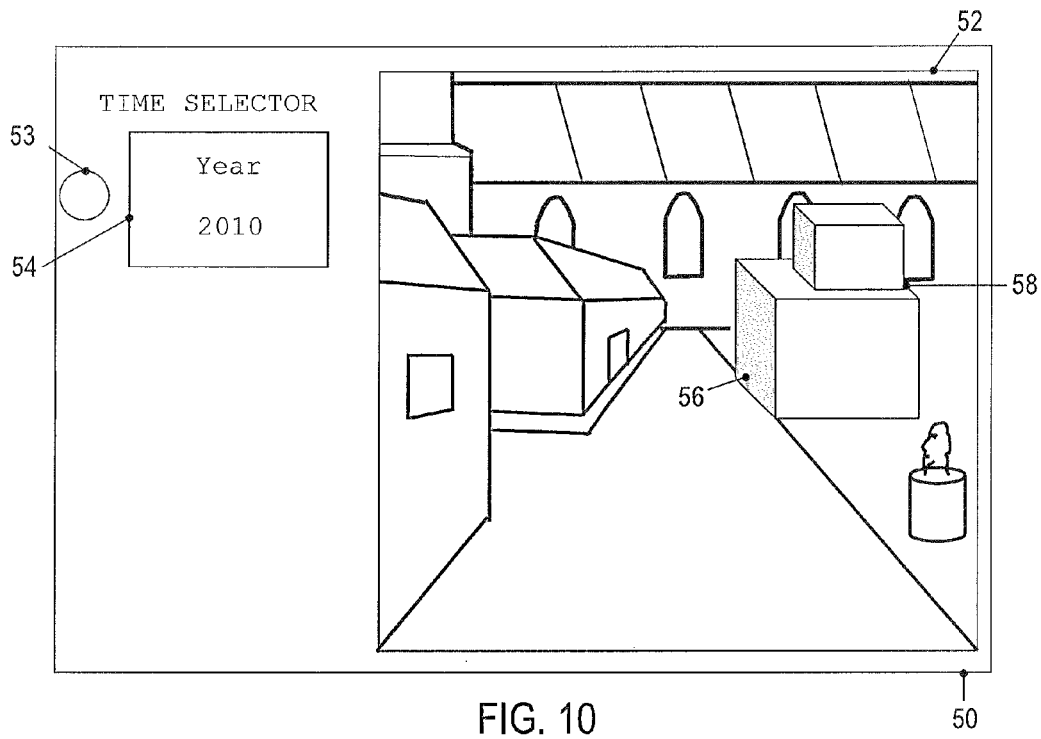

Historical attributes may relate to footprints and/or names of objects as described earlier. Alternatively, or additionally, historical attributes may relate to the 3D shape of objects. This may be of particular interest for electronic maps showing points of interest (POIs) or for electronic maps showing urban areas or other city models. FIGS. 8-10 illustrate an input/output (I/O) interface 50 of the navigation device of one exemplary embodiment. The I/O interface 50 may include a display on which an electronic map 52 is displayed. The I/O interface may include an input element 53 for setting a time selection input. The input element 53 may be implemented, for example, as a hard key or soft key. The I/O interface may include a section 54 on which the time in the past set via the input element 53 is displayed. The I/O interface 50 may be used in the navigation device 1 of an embodiment.

The electronic map 52 output by the navigation device may be a 3D map. For at least one map object shown on the electronic map 52 in 3D, the database 3 may store historical attributes which define a different 3D shape of the map object at times in the past. The processing device 2 may retrieve the time selection input set via the input element 53. The processing device 2 may retrieve historical attributes and may filter historical attributes based on the time selection input. The processing device 2 may be configured to identify historical attributes which are associated with a map object located in the geographical region of the electronic map 52 and to determine, based on the historical attributes and the time selection input, whether the respective map object had a different 3D shape in the past. In this way, the processing device 2 may determine which map objects have undergone a change from a historical configuration at the time set by the time selection input to a different current configuration. The processing device 2 may control the I/O interface such that graphical representations of map objects are generated which depend on both the historical 3D shape of the respective map object at the time indicated by the time selection input and the current 3D shape. The processing device 2 may determine the historical configuration based on the historical attributes, filtered in accordance with the time selection input. The processing device 2 may determine the current configuration based on the data 16 stored in the database 3.

Referring to FIG. 8, there is shown an electronic map 52 in which a 3D shape of a map object, such as a building, has undergone a change in the past. A 3D shape at the time in the past set by the time selection input is different from a current 3D shape. The processing device 2 may control the optical output device such that a graphical representation of the building displayed on the electronic map shows the current 3D shape and the historical 3D shape. To this end, the processing device 2 may determine boundaries of the building which were present at the time in the past indicated by the time selection input and which are also still present today. These boundaries may be displayed in a first style 56, for example. The processing device 2 may determine boundaries of the building which were present at the time in the past indicated by the time selection input and which are no longer present today. These boundaries may be displayed in a second style 57, for example. The processing device 2 may determine boundaries of the building which were not present at the time in the past indicated by the time selection input, but which are present in the current configuration. These boundaries may be displayed in a third style 58, for example. It will be appreciated that the union of the building portions 56, 58 defines the current configuration of the building. The union of the building portions 56, 57 defines the historical configuration of the building at the time in the past set by the time selection input. By generating a representation of the map object which is determined based on both the current configuration and the historical configuration of the map object, changes of the map object may be output in association with the current configuration.

Referring to FIGS. 9-10, the graphical representation of the building on the 3D map may be updated when the time selection input is modified. For illustration, as shown in FIG. 9, if another time is selected at which a part of the historical configuration shown at 57 in FIG. 8 had already been deconstructed, the graphical representation of the building is updated accordingly. In particular, the portion is updated which represents part of the building that was present at the time in the past indicated by the time selection input and which is no longer present in the current configuration. Information related to how the 3D shape of the building changed in the past may be thereby conveyed, in a manner controllable by the user via the time selection input.

FIG. 10 illustrates the I/O interface 50 after the time selection input was modified so as to select yet another time in the past. When the configuration, i.e., the 3D shape of the building at this other time is identical to the current configuration, the processing device 2 may update the graphical representation of the building. For example, portions 56, 58 of the building that define the current boundary of the building may be displayed, without also displaying portion 57.

Navigation devices and methods of exemplary embodiments may be configured to display map objects on electronic maps in a manner which utilizes the historical attributes. The relevant historical information associated with a given map object may be determined based on a comparison of the time set by the time selection input and information defining a validity time of historical attributes. The validity time may define a time or time span in the past in which the map object had the configuration as specified by the respective historical attribute. Historical attributes may be subject to a filtering based on the validity information and the time selection input, to thereby identify the historical attributes that apply to the time in the past set by the time selection input.

Figure 11:
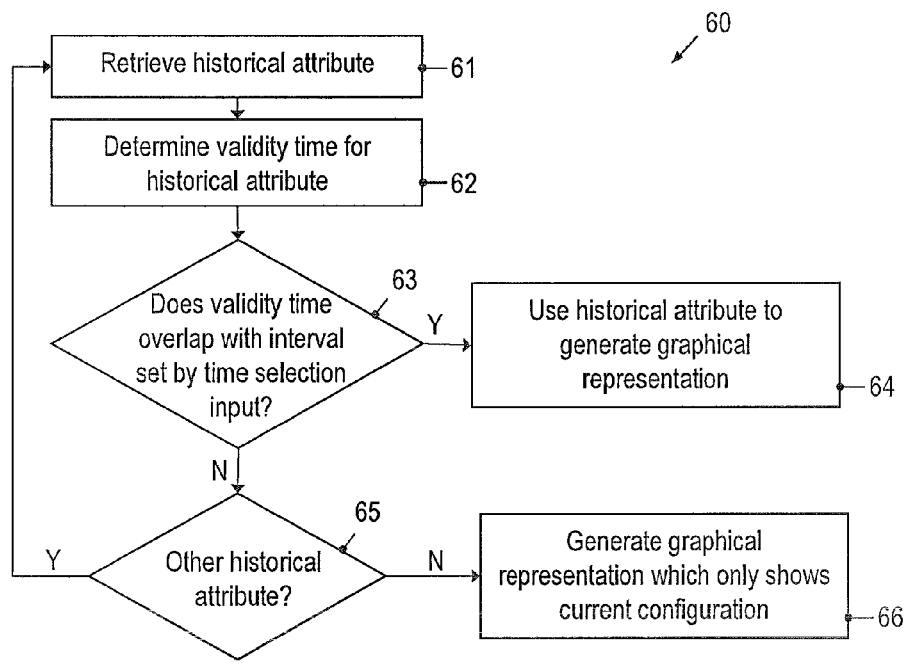
FIG. 11 is a flow chart of a procedure which may be used in the method of an embodiment.

FIG. 11 is a flow chart of a procedure 60 which illustrates one exemplary process of identifying relevant historical attributes. The procedure 60 may be performed to implement steps 43 and 44 in the method 40 of an exemplary embodiment. At 61, a historical attribute may be retrieved for a map object located in a geographical area for which an electronic map is to be displayed. At 62, the validity time may be determined for the retrieved historical attribute. The validity time may be retrieved from the database 3. The validity time may be a specific date or time span in the past. For illustration, the validity time may define a validity start time and a validity end time. The validity start time defines a time from which the historical configuration defined by the historical attribute applies. The validity end time defines a time from which the historical configuration defined by the historical attribute does not apply any more.

At 63, it may be determined whether the historical attribute has a validity time that makes it relevant for the time set by the time selection input. To this end, it may be determined whether the validity time overlaps with a time interval from the time defined by the time selection input and the current time. In the affirmative, the historical attribute is relevant for displaying a graphical representation of the map object, such that the graphical representation is also based on the respective historical attribute. The method proceeds to 64. At 64, the historical attribute may be used to generate a graphical representation of the respective object which depends on the historical attribute.

If it is determined at 64 that the historical attribute has a validity time that makes it irrelevant for the time set by the time selection input, the method proceeds to 65. This may be the case if the historical attribute relates to a configuration of the respective map object which no longer applies at the time set by the time selection input. At 65, it may be determined whether there is another historical attribute for the respective map object. In the affirmative, the method returns to 61. Otherwise, the method proceeds to 66 in which a graphical representation of the map object may be generated which shows the current configuration of the respective map object, without also showing the historical configuration. For example, if no historical attribute is available in the database which would apply for the time set by the time selection input, a representation of the map object may be shown which independent of the time in the past. In other implementations, the map object may be omitted from the graphical representation if there is no historical data available for the time in the past set by the time selection input.

Various modifications of the procedure 60 may be implemented in other embodiments. For illustration, instead of determining whether the validity time of a historical attribute coincides with or overlaps with the time set by the time selection input, it can be determined whether the validity time and the time set by the time selection input differ by less than a threshold. In the affirmative, the respective historical attribute may be used for generating the graphical representation at 64. In yet another implementation, the one of the historical attributes for a map object may be selected for generating a graphical representation which is closest to the time set by the time selection input.

In any one of the various embodiments, the historical attributes stored in the database of the navigation device may be used for displaying historical information on an electronic map. Additionally, or alternatively, the historical attributes may be used for address or point of interest (POI) identification. For illustration, when an address or name of a POI is input, the processing device may start searching for a match in the data 16 which define the current configuration of the map objects. If no match is found in the current configuration data, the search may be continued in the historical attributes relating to names of map objects in the past. Such a search in the historical attributes may be performed when the user specifies the region for which an electronic map is to be displayed by inputting the address or the name of a POI. An electronic map including historical data may thus be displayed for a certain region identified using a historical address or POI name which no longer applies at present.

Additionally or alternatively, the historical attributes stored in the database of the navigation device may be used for route guidance functions. For illustration, when a start point or destination of a route search is input, the processing device may start searching for a match in the data 16 that define the current configuration of the map objects. If no match is found in the current configuration data, the search may be continued in the historical attributes relating to names of map objects in the past.

While devices and methods according to embodiments have been described in detail, modifications may be implemented in other embodiments. For illustration, while embodiments using a database which includes a table that stores current configuration data and historical attributes have been described in detail, other database structures may be used.

For further illustration, while embodiments have been described in detail in which one of the historical configuration or the current configuration of a map object may be displayed as an overlay superimposed onto the other one of the historical configuration or the current configuration of a map object, any other suitable technique may be used that combines the historical configuration and the current configuration to a graphical representation of the map object. For illustration, portions of a map object may be displayed in different styles, depending on whether the portion is included in both the historical configuration and the current configuration, whether the portion is included in the historical configuration but not in the current configuration, and whether the portion is included in the current configuration but not the historical configuration. Such a technique of displaying map objects may enable both construction and deconstruction of building portions to be visualized and understood in the context of the current map.

For further illustration, the historical attributes may be used to automatically display a sequence of graphical representations of an object that shows how the configuration of the map object changed in the past, e.g., starting from the time set by the time selection input at the user interface. The graphical representation of the map object may be automatically determined for a plurality of different times in the past. The plural times in the past may be set by starting from the time corresponding to the time selection input and then adding increments to that time. For each one of these times in the past, a geometrical representation of the map object may be determined that depends on the historical attribute(s) valid at the respective time and a current configuration of the map object. The changes in the state of a map object may thus be played back to the user, in a manner which is similar to a movie. Such information may be useful for navigation tasks, e.g., when the changes in the state of the map object show that a certain road segment is periodically blocked for certain time periods and should thus be avoided. This may be the case for road segments in mountain regions in winter time or for road segments in rainfall periods which periodically occur at certain times of the year.

For further illustration, while road segments, buildings and city furnishing objects are exemplary map objects, the techniques described herein also apply to other map objects. For illustration, a digital elevation model (DEM) may serve as a map object. Changes in the terrain which occur as a function of time may be visualized when using historical attributes for DEM data.

The historical attributes may define the full historical configuration of the respective map object, e.g., the footprint or other shape of the map object at the respective time in the past. However, in any one of the embodiments described herein, a delta data format may be used in which the historical attributes include data that defines differences between the historical configuration at the respective time in the past and the current configuration.

According to exemplary embodiments, the navigation device may be utilized as an electronic travel guide which provides historical information on the road network, on buildings, and/or city furnishing. A database having historical attributes may be utilized to convey such information to the user in a way that allows the historical changes to be understood in the context of the current real view environment.

Embodiments of the invention may be used for navigation devices. Embodiments of the invention may in particular be used for vehicle navigation devices. The navigation device may include a mobile personal navigation device or a navigation device of a vehicle, such as an automobile, a boat, an airplane, or any other passenger carrying conveyance. The mobile personal navigation device may be a hand-held device which may be used inside and/or outside a vehicle. The navigation device of the vehicle may include a navigation device installed in a vehicle or may be part of an entertainment system or computer system of the vehicle.

While various examples of the invention have been described, it will be apparent to those of ordinary skill in the art that many more examples and implementations are possible within the scope of the invention. Accordingly, the invention is not to be restricted except in light of the attached claims and their equivalents.

The invention claimed is:

1. A navigation device, comprising:
a database storing map data, the map data comprising current information related to a current configuration of each of a plurality of map objects, the current configuration being respectively a most recent monitored configuration of each of the plurality of map objects, and one or more historical attributes of one or more of the plurality of map objects, the one or more historical attributes associated with a map object comprising historical information related to a historical configuration of the map object in the past;
a user interface configured to receive a time selection input; and
a processing device coupled to the database and the user interface, the processing device configured to identify, based on the one or more historical attributes and the time selection input, at least one of the plurality of map objects for which the current configuration is different from the historical configuration, wherein the historical configuration corresponds to a time in the past that is determined based on the time selection input, the processing device configured to retain, when a map update is performed, information from the map data in use prior to the map update as the one or more historical attributes, the processing device further configured to control an optical output device to output a graphical representation of the identified map object on an electronic map, wherein the graphical representation is dependent on both the current configuration and the historical configuration of the identified map object, the processing device further configured to perform route guidance based on the one or more historical attributes and access the one or more historical attributes to retrieve a destination address for route guidance if an address input by a user is not included in the current configuration.

2. The navigation device of claim 1, wherein the processing device is configured to control the optical output device to output the graphical representation such that the graphical representation simultaneously shows the current configuration and the historical configuration of the identified map object.

3. The navigation device of claim 2, wherein the processing device is configured to control the optical output device such that the graphical representation shows the current configuration of the identified map object in a first output mode and the historical configuration of the identified map object in a second output mode different from the first output mode.

4. The navigation device of claim 2, wherein the processing device is configured to control the optical output device to output the graphical representation such that one of the current configuration or the historical configuration is displayed as an overlay for the other one of the current configuration or the historical configuration.

5. The navigation device of claim 2, wherein the processing device is configured to monitor whether a subsequent time selection input is received at the user interface and to control the optical output device to update the graphical representation in response to receipt of the subsequent time selection input.

6. The navigation device of claim 2, wherein the identified map object is a road segment, and the current configuration and the historical configuration correspond to different courses of the road segment and/or different names of the road segment.

7. The navigation device of claim 2, wherein the identified map object is a building, and the current configuration and the historical configuration correspond to different boundaries of the building.

8. The navigation device of claim 1, wherein the processing device is configured to determine a plurality of different historical configurations of the identified map object at a plurality of different times in the past, each of the plurality of different times being included in a time interval having a start time defined by the time selection input.

9. The navigation device of claim 8, wherein the processing device is configured to control the optical output device to output a plurality of graphical representations of the identified map object in a time-sequential manner, each one of the plurality of graphical representations depending on the current configuration and at least one of the plurality of historical configurations of the identified map object.

10. The navigation device of claim 1, wherein the one or more historical attributes comprise validity information defining a time span to which the historical configuration applies.

11. The navigation device of claim 10, wherein the processing device is configured to retrieve the validity information and to compare the validity information to the time in the past that is determined based on the time selection input.

12. The navigation device of claim 1, wherein the one or more historical attributes comprise a footprint of a building in the past.

13. The navigation device of claim 1, wherein the one or more historical attributes comprise a three-dimensional shape of a building in the past.

14. The navigation device of claim 1, wherein the processing device is configured to store a release date of the map update to indicate to which time in the past the historical configuration applies.

15. A method of outputting an electronic map based on map data stored in a database, the map data comprising current information related to a current configuration of each of a plurality of map objects, the current configuration being respectively a most recent monitored configuration of each of the plurality of map objects, and one or more historical attributes of one or more of the plurality of map objects, the one or more historical attributes associated with a map object comprising historical information related to a historical configuration of the respective map object in the past, the method comprising:
　retaining, when a map update is performed, information from the map data in use prior to the map update as the one or more historical attributes;
　receiving a time selection input at a user interface;
　processing the map data to identify, based on the one or more historical attributes and the time selection input, a map object having a current configuration different from a historical configuration at a time in the past which is determined based on the time selection input;
　controlling an optical output device to output a graphical representation of the identified map object on the electronic map, the graphical representation being dependent on both the current configuration and the historical configuration of the identified map object; and
　performing route guidance based on the one or more historical attributes and accessing the one or more historical attributes to retrieve a destination address for route guidance if an address input by a user is not included in the current configuration.

16. The method of claim 15, further comprising:
　determining a plurality of different historical configurations of the identified map object at a plurality of different times in the past; and
　controlling the optical output device to output a plurality of graphical representations of the identified map object in a time-sequential manner.

17. A non-transitory computer readable medium comprising a plurality of instructions executable by a processor, the storage medium comprising:
　instructions executable to receive a time selection input;
　instructions executable to identify a map object having a current configuration that is different from a historical configuration, the current configuration being a most recent monitored configuration of the map object, the historical configuration of the map object corresponding to a time in the past that is determined based on the time selection input;
　instructions executable to control an optical device to output a graphical representation of the identified map object on an electronic map, the graphical representation being dependent on both the current configuration and the historical configuration of the identified map object;
　instructions executable to retain, when a map update is performed, information from the map data in use prior to the map update as one or more historical attributes; and
　instructions executable to perform route guidance based on the one or more historical attributes and access the one or more historical attributes to retrieve a destination address for route guidance in an address input by a user is not included in the current configuration.

18. The storage medium of claim 17, further comprising:
　instructions executable to retrieve validity information defining a time span over which the historical configuration is valid; and
　instructions executable to compare the validity information to the time in the past that is determined based on the time selection input.

19. A navigation device, comprising:
　a database storing map data, the map data comprising current information related to a current configuration of each of a plurality of map objects, the current configuration being respectively a most recent monitored configuration of each of the plurality of map objects, and one or more historical attributes of one or more of the plurality of map objects, the one or more historical attributes associated with a map object comprising historical information related to a historical configuration of the map object in the past;
　a user interface configured to receive an address input; and
　a processing device coupled to the database and the user interface, the processing device configured to identify, based on the one or more historical attributes, at least one of the plurality of map objects for which the current configuration is different from the historical configuration, wherein the historical configuration corresponds to a time in the past, the processing device further configured to control an optical output device to output a graphical representation of the identified map object on an electronic map, the processing device further configured to access the one or more historical attributes to retrieve a destination address for route guidance if an address input by a user is not included in the current configuration.

* * * * *